(12) United States Patent
Nakazawa

(10) Patent No.: US 7,872,832 B2
(45) Date of Patent: Jan. 18, 2011

(54) MAGNETIC HEAD DEVICE HAVING HOOK FOR MECHANICALLY PRESSURE-MOUNTING SLIDER

(75) Inventor: Kunihiro Nakazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 814 days.

(21) Appl. No.: 11/345,026

(22) Filed: Feb. 1, 2006

(65) Prior Publication Data

US 2006/0176615 A1 Aug. 10, 2006

(30) Foreign Application Priority Data

Feb. 8, 2005 (JP) .............................. 2005-032153

(51) Int. Cl.
*G11B 5/60* (2006.01)
(52) U.S. Cl. ............... 360/234.6; 360/245.3; 360/245.7
(58) Field of Classification Search ............. 360/134.5, 360/234.3–234.6, 245.7, 245, 246.4, 245.2–245.5
See application file for complete search history.

(56) References Cited

U.S. PATENT DOCUMENTS

| | | | | |
|---|---|---|---|---|
| 5,079,659 | A * | 1/1992 | Hagen | 360/234.6 |
| 5,126,901 | A * | 6/1992 | Momoi et al. | 360/234.5 |
| 5,243,482 | A * | 9/1993 | Yamaguchi et al. | 360/245.4 |
| 5,390,059 | A | 2/1995 | Tokuyama et al. | |
| 5,757,585 | A * | 5/1998 | Aoyagi et al. | 360/234.5 |
| 5,956,208 | A * | 9/1999 | Kawazoe | 360/234.5 |
| 6,163,438 | A * | 12/2000 | Kajitani | 360/245.7 |
| 6,229,673 | B1 * | 5/2001 | Shinohara et al. | 360/246.2 |
| 6,690,551 | B2 | 2/2004 | Shiraishi et al. | |
| 6,829,818 | B2 | 12/2004 | Kamigama et al. | |
| 6,956,724 | B2 | 10/2005 | Shiraishi et al. | |

2006/0072245 A1 4/2006 Motonishi et al.

FOREIGN PATENT DOCUMENTS

| | | |
|---|---|---|
| JP | 60-12865 | 1/1985 |
| JP | 63014385 A * | 1/1988 |
| JP | 02-260181 | 10/1990 |
| JP | 3-5981 | 1/1991 |
| JP | 05-166317 | 7/1993 |
| JP | 5-79763 | 10/1993 |
| JP | 6-4456 | 2/1994 |

(Continued)

OTHER PUBLICATIONS

Office Action for corresponding Japanese Patent Application No. 2005-032153.

(Continued)

*Primary Examiner*—William J Klimowicz
*Assistant Examiner*—Carlos E Garcia
(74) *Attorney, Agent, or Firm*—Brinks Hofer Gilson & Lione

(57) ABSTRACT

A locking segment presses a slider towards a supporting member so that the slider is fixed to the supporting member. In the present invention, the slider is mechanically pressure-mounted to the supporting member without the use of an adhesive. This reduces the fluctuation of the distance between the slider and the supporting member. Accordingly, when a magnetic head is scanning a recording medium in a floating fashion, the floating distance of the magnetic head can be readily controlled within a predetermined range.

15 Claims, 8 Drawing Sheets

FOREIGN PATENT DOCUMENTS

| | | |
|---|---|---|
| JP | 06-203507 | 7/1994 |
| JP | 07-057417 | 3/1995 |
| JP | 09-213036 | 8/1997 |
| JP | 09-251627 | 9/1997 |
| JP | 10-055641 | 2/1998 |
| JP | 2002-150734 | 5/2002 |
| JP | 2003-016616 | 1/2003 |
| WO | 02/100156 A2 | 12/2002 |

OTHER PUBLICATIONS

Office Action issued in related Chinese Patent Application No. 2005100640121; issued Jul. 6, 2006.

Office Action issued in related Japanese Patent Application No. 2004-291562; issued Sep. 2, 2008.

\* cited by examiner

MAGNETIC HEAD DEVICE HAVING HOOK FOR MECHANICALLY PRESSURE-MOUNTING SLIDER

BACKGROUND OF THE INVENTION

1. Field of the Invention

The present invention relates to magnetic head devices that include sliders having magnetic elements and supporters for supporting the sliders, and particularly, to a magnetic head device in which a slider is accurately maintained in position on a supporter.

2. Description of the Related Art

FIG. 12 is an exploded perspective view illustrating a part of a conventional magnetic head device.

A slider 30 is composed of a ceramic material, such as alumina-titan-carbide ($Al_2O_3$—TiC). A trailing-end surface 30b of the slider 30 is provided with a magnetic element 1 and an electrode unit P.

The magnetic element 1 is formed by thin-film deposition, such as a sputtering technique, and is a laminate including an MR head (reproducing head) and an inductive head for recording. The MR head has a magneto-resistive sensor, which may be a typical spin-valve type such as a GMR sensor and an AMR sensor.

A coil layer (not shown) of the inductive head included in the magnetic element 1 is connected to the electrode unit P via a lead layer (not shown). A sensing current is applied to the MR head from the electrode unit P.

A supporter 10 includes a flexure 11 that supports the slider 30, and a load beam 12 that supports the flexure 11. The load beam 12 is composed of, for example, a stainless leaf spring. The longitudinal sides of the load beam 12 are each provided with a bent segment 12a. The bent segments 12a have rigidity. An area extending from rear ends 12a1 of the bent segments 12a to a base segment 12c of the load beam 12 defines a leaf-spring functional portion 12d. The bent segments 12a do not extend into this leaf-spring functional portion 12d. The slider 30 is elastically supported above a recording medium due to an elastic force of the leaf-spring functional portion 12d. The base segment 12c of the load beam 12 defines a mounting portion, which is mounted to a driver (not shown) of a hard-disk device.

A front end portion of the flexure 11 is provided with a tongue segment 15, which is formed by partially cutting out the flexure 11. The slider 30 is fixed on the tongue segment 15 via an adhesive 14 composed of ultraviolet curing resin and thermosetting resin and also via conductive resin 13. The conductive resin 13 is for providing electrical conduction between the slider 30 and the flexure 11. The tongue segment 15 is provided with electrode connection parts 16 which are to be connected to the electrode unit P of the slider 30.

When a recording medium starts to rotate in response to an operation of a rotary driver, airflow is introduced into a space between the slider 30 and the top surface of the recording medium. Thus, the slider 30 moves above the recording medium while floating above the recording medium by a predetermined distance.

Japanese Unexamined Utility Model Registration Application Publication No. 5-79763 and Japanese Examined Utility Model Registration Application Publication No. 6-4456 each disclose a structure in which the slider is sandwiched by a front end portion of a suspension that holds the slider.

However, conventional magnetic head devices had problems in maintaining a stable floating distance between the slider and the recording medium.

According to a technique for mounting the slider 30 to the tongue segment 15 of the flexure 11 shown in FIG. 12, it is difficult to apply the resin uniformly. Moreover, the resin could possibly become deformed during the manufacturing process, such as the bonding process, and also during the use of the magnetic head device. With the increasing recording density in recording media in recent years, a magnetic head for recording/reproducing is demanded to be disposed closer to the recording medium as much as possible while still being set above the recording medium in a floating fashion. Specifically, the floating distance between a magnetic head and a recording medium has reached a range of about 9 nm to 10 nm. If the floating distance of a magnetic head is such a small value, a slight deformation in the resin that bonds the slider 30 to the tongue segment 15 of the flexure 11 may affect the floating distance. As a result, this could adversely affect the recording/reproducing properties of the magnetic head device.

Furthermore, with the higher sensitivity in magnetic reproducing heads in recent years, the magnetic reproducing heads now have weaker resistance to static electricity. Even though the conductive resin 13 is for providing electrical conduction between the slider 30 and the flexure 11, it has become difficult to protect such magnetic reproducing heads having weak resistance from static electricity by grounding via the conductive resin 13.

Furthermore, according to the magnetic head devices disclosed in Japanese Unexamined Utility Model Registration Application Publication No. 5-79763 and Japanese Examined Utility Model Registration Application Publication No. 6-4456, the slider is sandwiched in the horizontal direction. This means that the slider and the suspension (i.e. a flexure) can easily form a gap therebetween. This could easily lead to a fluctuation of the floating distance of the magnetic head. Particularly, although Japanese Examined Utility Model Registration Application Publication No. 6-4456 discusses a structure in which the slider is sandwiched using a shape-memory alloy, the mounting force of the slider in this structure may fluctuate in response to a change in the ambient temperature.

SUMMARY OF THE INVENTION

Accordingly, it is an object of the present invention to provide a magnetic head device in which the fluctuation of a floating distance between a magnetic head and a recording medium is reduced so as to achieve stable recording/reproducing properties.

A magnetic head device according to the present invention includes a slider having a magnetic element for recording and/or reproducing; and a supporting member supporting the slider. A locking segment extending from the supporting member presses the slider towards the supporting member so that the slider is fixed to the supporting member.

According to the present invention, the locking segment presses the slider towards the supporting member so that the slider is fixed to the supporting member. In the present invention, the slider is mechanically pressure-mounted to the supporting member without the use of an adhesive. This reduces the fluctuation of the distance between the slider and the supporting member. Accordingly, when the magnetic head is scanning a recording medium in a floating fashion, the floating distance of the magnetic head can be readily controlled within a predetermined range.

Furthermore, the slider and the supporting member may be electrically conductive. Thus, electrical grounding of the slider can be achieved by pressing the slider against the supporting member. In the present invention, the slider can be made directly in contact with the supporting member so that an electrical charge can flow smoothly to a ground, thereby preventing electrostatic damage of the magnetic head.

Furthermore, at least one side surface of the slider is preferably provided with a recess or a projection. In this case, the locking segment presses the recess or the projection towards the supporting member so that the slider is fixed to the supporting member.

Furthermore, the slider preferably has a hexahedral structure, one of the side surfaces of the hexahedron defining an electrode surface provided with an electrode unit, the above-referenced at least one side surface including two of the side surfaces of the hexahedron that are adjacent to the electrode surface, each of the two side surfaces having the recess or the projection.

Accordingly, since the slider is pressure-mounted to the supporting member due to the locking member, the positions of the two side surfaces of the slider having the recesses or the depressions are regulated on the supporting member.

Furthermore, the supporting member may have an electrode connection part that is connected to the electrode surface of the slider with a conductive connector disposed therebetween, such that the position of the electrode surface on the supporting member is regulated.

Furthermore, the supporting member may have a regulating segment extending therefrom, the regulating segment regulating the position of a side surface of the hexahedron that is opposite to the electrode surface on the supporting member.

In the present invention, for example, the locking segment may have a bent portion formed by bending a tip or a side of the locking segment. In this case, the slider is pressure-mounted to the supporting member due to a force component of force applied from the bent portion disposed at the tip or the side of the locking segment, the force component acting towards the supporting member.

The locking segment may be integrated with the supporting segment. For example, the locking segment may be formed by cutting out a section of the supporting member. Alternatively, the locking segment may be a separate component from the supporting member.

According to the present invention, the slider is mechanically pressure-mounted to the supporting member without the use of an adhesive. This reduces the fluctuation of the distance between the slider and the supporting member. Accordingly, when the magnetic head is scanning a recording medium in a floating fashion, the floating distance of the magnetic head can be readily controlled within a predetermined range.

Furthermore, since the slider and the supporting member are electrically conductive, electrical grounding of the slider can be achieved by pressing the slider against the supporting member. In the present invention, the slider can be made directly in contact with the supporting member so that an electrical charge can flow smoothly to a ground, thereby preventing electrostatic damage of the magnetic head.

DESCRIPTION OF THE PREFERRED EMBODIMENTS

Figure 1:
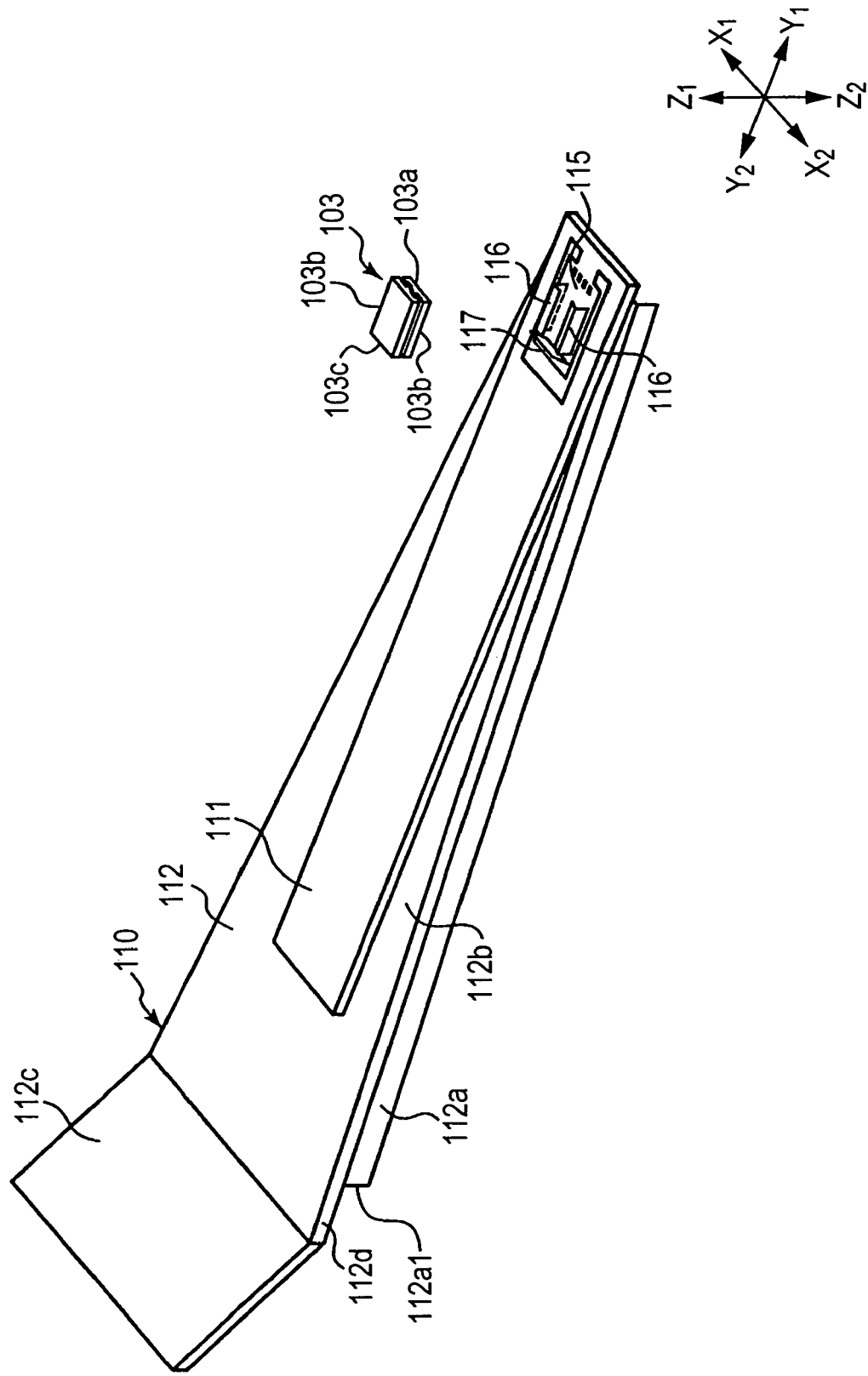
FIG. 1 is an exploded perspective view illustrating a part of a magnetic head device according to a first embodiment of the present invention.
Figure 2:
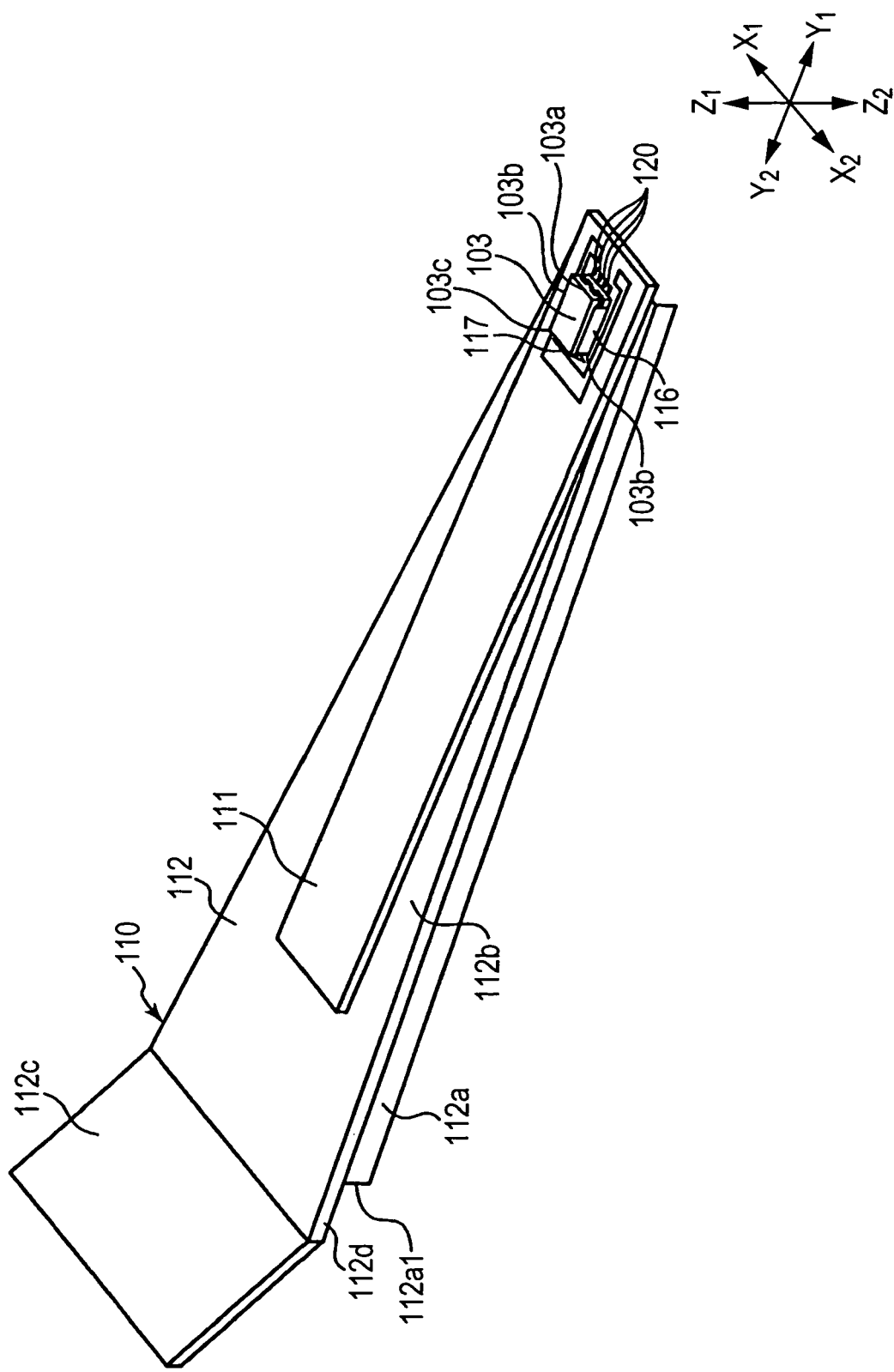
FIG. 2 is a partial perspective view of the magnetic head device according to the first embodiment.
Figure 3:
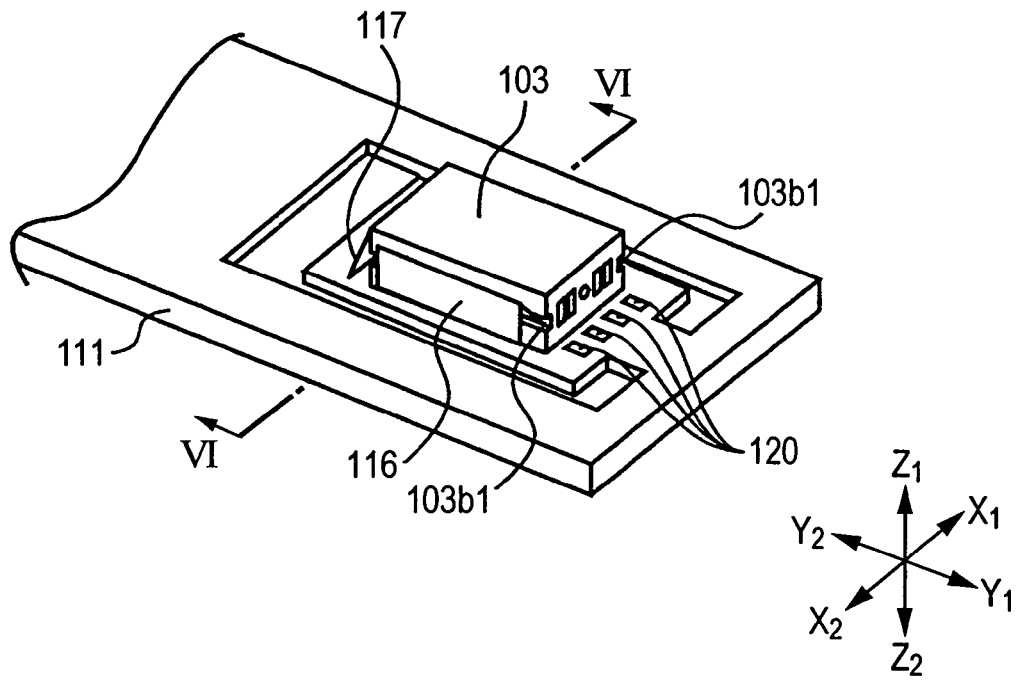
FIG. 3 is a partially enlarged perspective view of a flexure (supporting member) that supports a slider.
Figure 4:
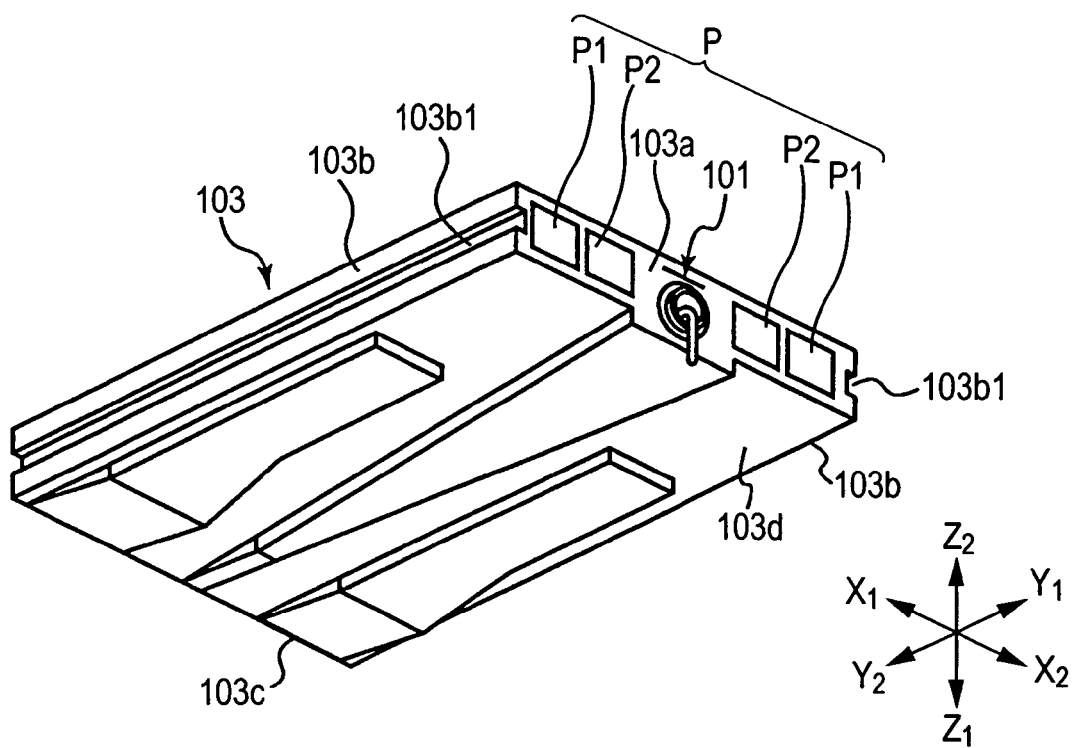
FIG. 4 is a perspective view of the slider shown in FIGS. 1 to 3.
Figure 5:
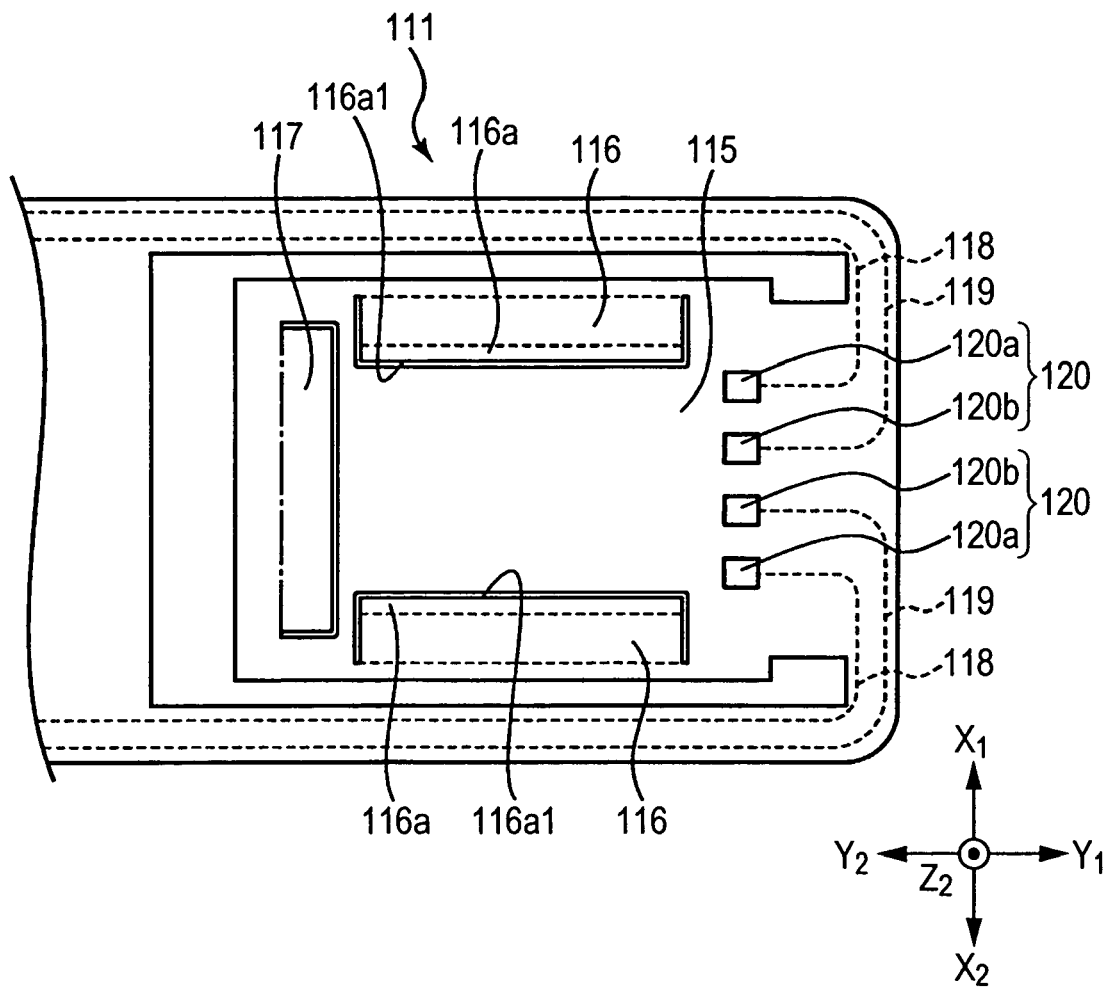
FIG. 5 is a plan view of the flexure in its unassembled state.
Figure 6:
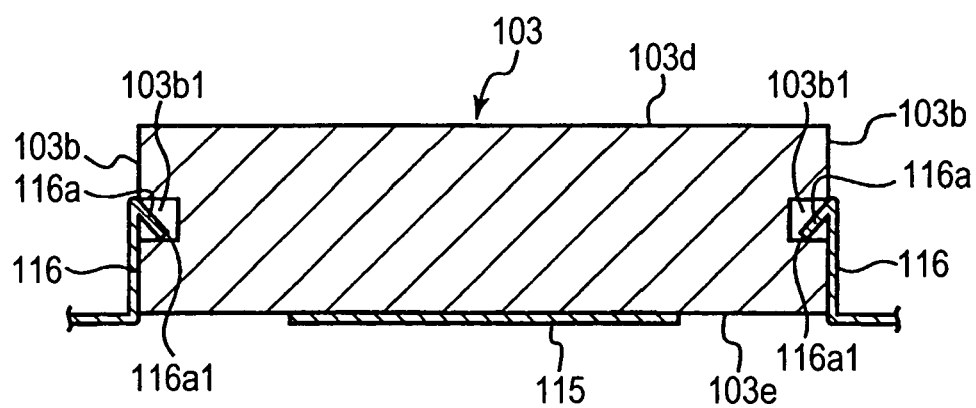
FIG. 6 is a cross-sectional view taken along line VI-VI in FIG. 3.
Figure 7:
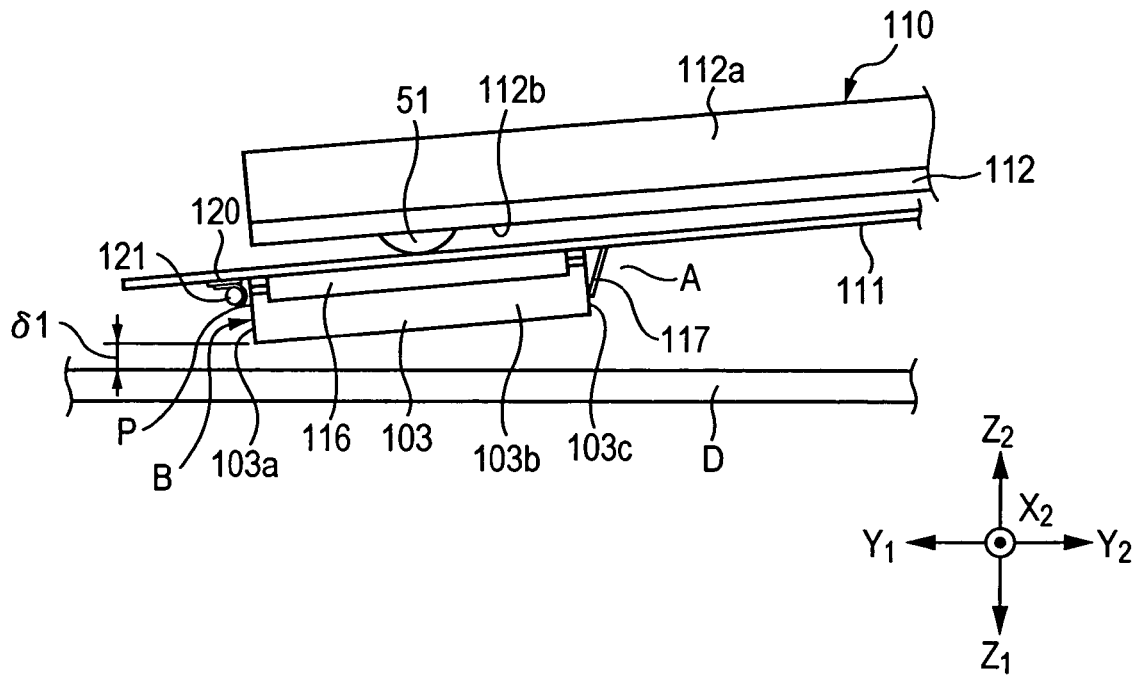
FIG. 7 is a partial side view illustrating a state in which the slider of the magnetic head device according to the first embodiment is scanning over a recording medium in a floating fashion.

FIG. 1 is an exploded perspective view illustrating a part of a magnetic head device according to a first embodiment of the present invention. FIG. 2 is a partial perspective view of the magnetic head device according to the first embodiment. FIG. 3 is a partially enlarged perspective view of a flexure 111 (supporting member), which supports a slider 103. FIG. 4 is a perspective view of the slider 103. FIG. 5 is a plan view of the flexure 111 in its unassembled state. FIG. 6 is a cross-sectional view taken along line VI-VI in FIG. 3. FIG. 7 is a partial side view illustrating a state in which the slider 103 of the magnetic head device according to the first embodiment is scanning over a recording medium in a floating fashion.

A supporter 110 includes the flexure 111 that supports the slider 103, and a load beam 112 that supports the flexure 111. The flexure 111 and the load beam 112 are composed of, for example, stainless leaf springs. The longitudinal sides of the load beam 112 are each provided with a bent segment 112a. The bent segments 112a have rigidity. An area extending from rear ends 112a1 of the bent segments 112a to a base segment 112c of the load beam 112 defines a leaf-spring functional portion 112d. The bent segments 112a do not extend into this leaf-spring functional portion 112d. The slider 103 is elastically supported above a recording medium due to an elastic force of the leaf-spring functional portion 112d. The base segment 112c of the load beam 112 defines a mounting portion, which is mounted to a driver (not shown) of a hard-disk device.

A front end portion of the flexure 111 is provided with a tongue segment 115, which is formed by partially cutting out the flexure 111. The slider 103 is fixed on the tongue segment 115. The slider 103 is composed of a ceramic material, such as alumina-titan-carbide ($Al_2O_3$—TiC).

Referring to FIG. 4, the slider 103 has a hexahedral structure. One side of the hexahedron defines an electrode surface 103a provided with an electrode unit P. The electrode surface 103a has a magnetic element 101 and the electrode unit P (not shown in FIG. 1). The electrode surface 103a is also a trailing-end surface.

The magnetic element 101 is formed by thin-film deposition, such as a sputtering technique, and is a laminate including an MR head (reproducing head) and an inductive head for recording. The MR head has a magneto-resistive sensor, which may be a typical spin-valve type such as a GMR sensor and an AMR sensor. A coil layer (not shown) of the inductive head included in the magnetic element 101 is connected to electrodes P1, P1 via a lead layer (not shown). A sensing current is applied to the MR head from electrodes P2, P2, and the MR head obtains a magnetic reproducing signal from the electrodes P2, P2. Two side surfaces 103b, 103b that are adjacent to the electrode surface 103a are respectively provided with recesses 103b1, 103b1.

Referring to FIGS. 2, 3, and 6, the two side surfaces of the slider 103 are provided with the recesses 103b1, 103b1. Locking segments 116 extending from the tongue segment 115 of the flexure 111 press the recesses 103b1, 103b1 towards the flexure 111 so that the slider 103 is fixed to the flexure 111.

Accordingly, since the slider 103 is pressure-mounted to the flexure 111 due to the locking segments 116, the positions of the two side surfaces 103b, 103b of the slider 103 having the recesses 103b1, 103b1 are regulated on the flexure 111.

Referring to FIG. 5, a section of the tongue segment 115 in the front end portion of the flexure 111 is cut and bent upward so as to form a regulating segment 117. The regulating segment 117 is for positioning the locking segments 116, 116 and a leading-end surface 103c of the slider 103. FIG. 5 shows electrode connection parts 120a, 120a to be connected respectively to the electrodes P1, P1 of the slider 103; electrode connection parts 120b, 120b to be connected respectively to the electrodes P2, P2; and wires 118, 119 that are connected to these electrode connection parts 120. These wires 118, 119 connected to the electrode connection parts 120 are not shown in FIGS. 1, 2, and 3.

Referring to the cross-sectional view of FIG. 6, the tip of each locking segment 116 is bent so as to form a hook portion 116a. A force component of force applied from a tip 116a1 of each hook portion 116a to the corresponding recess 103b1 of the slider 103 acts towards the tongue segment 115 (i.e. towards the flexure 111). This force component allows the slider 103 to be pressure-mounted to the tongue segment 115 (i.e. the flexure 111).

Referring to the side view of FIG. 7, the electrode unit P disposed on the electrode surface 103a of the slider 103 is connected to the electrode connection parts 120 disposed on the tongue segment 115 (the flexure 111) via a conductive connector (ball-bonding) 121. This regulates the position of the electrode surface (i.e. the trailing-end surface) 103a on the flexure 111.

Figure 11:
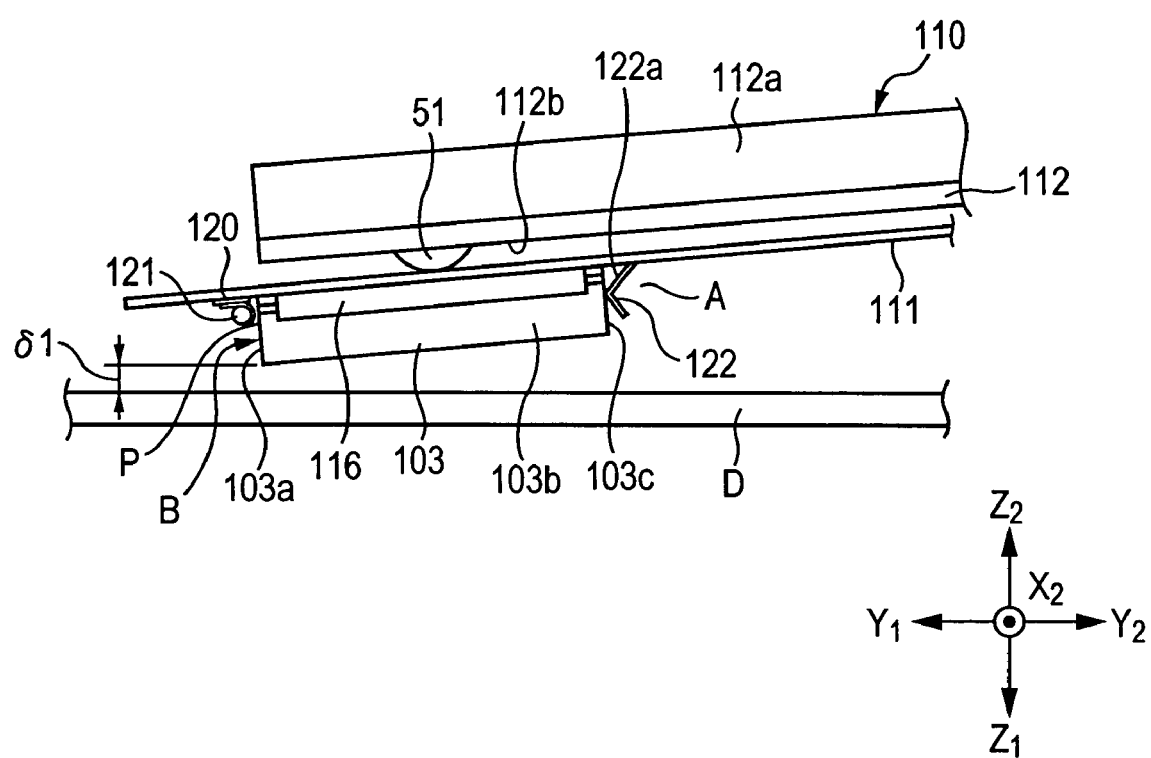
FIG. 11 is a partial side view illustrating a state in which the slider of a magnetic head device according to a fourth embodiment of the present invention is scanning over a recording medium in a floating fashion.
Figure 12:
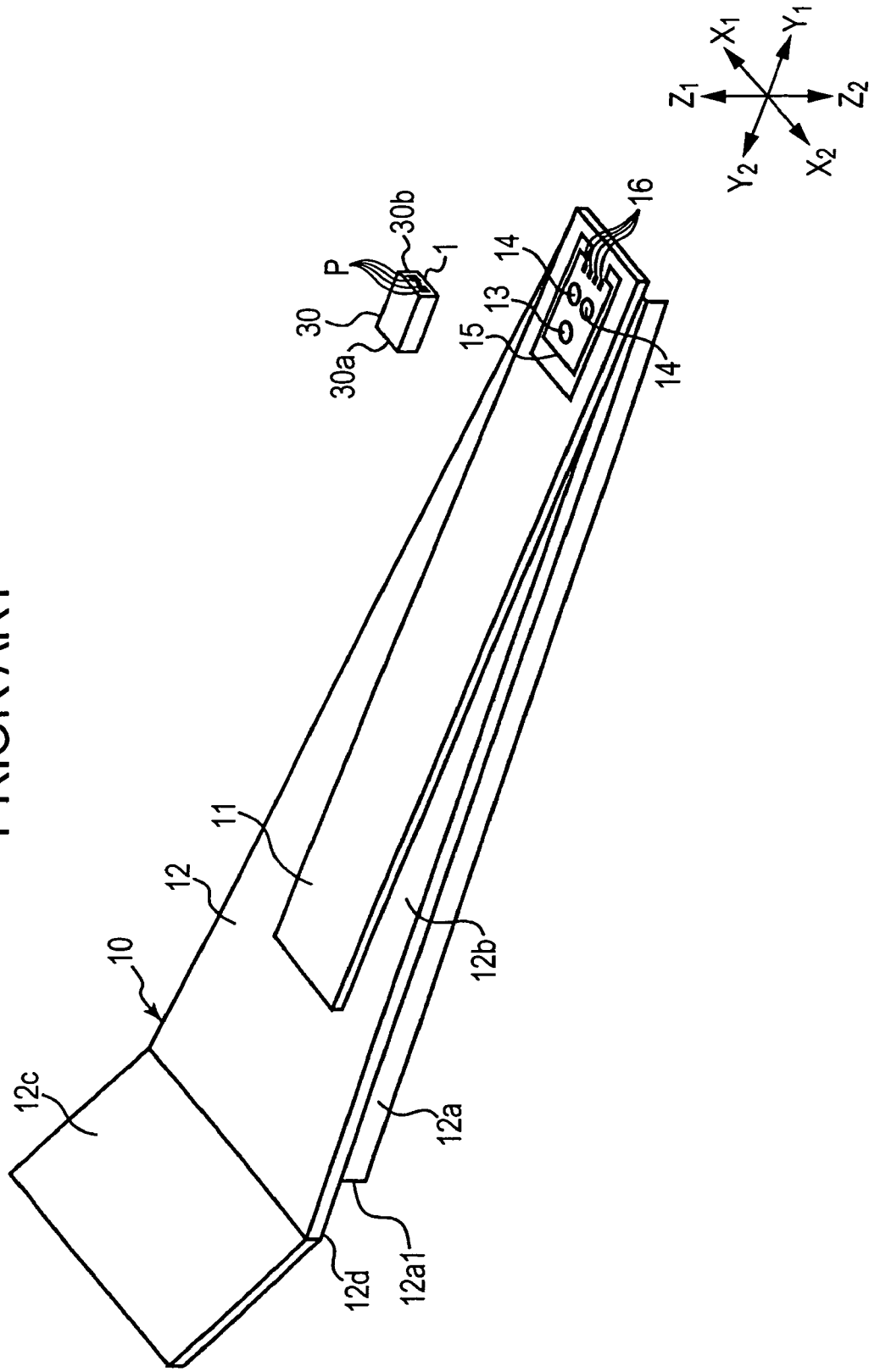
FIG. 12 is an exploded perspective view illustrating a part of a conventional magnetic head device.

Furthermore, the position of the leading-end surface 103c of the slider 103 (i.e. the side surface opposite to the electrode surface 103a) on the flexure 111 is regulated by the regulating segment 117 extending from the tongue segment 115 of the flexure 111. The shape of the regulating segment for regulating the position of the leading-end surface 103c of the slider 103 on the flexure 111 is not limited to the one shown in FIG. 7. Alternatively, as shown in FIG. 11, a regulating segment 122 having a folded shape may be applied. In that case, the position of the leading-end surface 103c of the slider 103 on the flexure 111 is regulated by a spine 122a of the folded portion of the regulating segment 122.

When a recording medium D starts to rotate in response to an operation of a rotary driver, airflow is introduced into a space between a surface 103d of the slider 103 facing the recording medium D and the top surface of the recording medium D. Thus, the slider 103 moves above the recording medium D while floating above the recording medium D by a predetermined distance $\delta 1$.

According to the present invention, the locking segments 116 press the slider 103 against the flexure 111 so that the slider 103 is fixed to the flexure 111. In the present invention, the slider 103 is mechanically pressure-mounted to the flexure 111 without the use of an adhesive. This reduces the fluctuation of the distance between the slider 103 and the flexure 111. Accordingly, referring to FIG. 7, when the magnetic head is scanning the recording medium D in a floating fashion, the floating distance $\delta 1$ of the magnetic head can be readily controlled within a predetermined range.

Furthermore, since the slider 103 and the flexure 111 are electrically conductive, electrical grounding of the slider 103 can be achieved by pressing the slider 103 against the flexure 111. In the present invention, a back surface 103e of the slider 103 is directly in contact with the flexure 111 so that an electrical charge can flow smoothly to a ground, thereby preventing electrostatic damage of the magnetic element 101.

Figure 8:
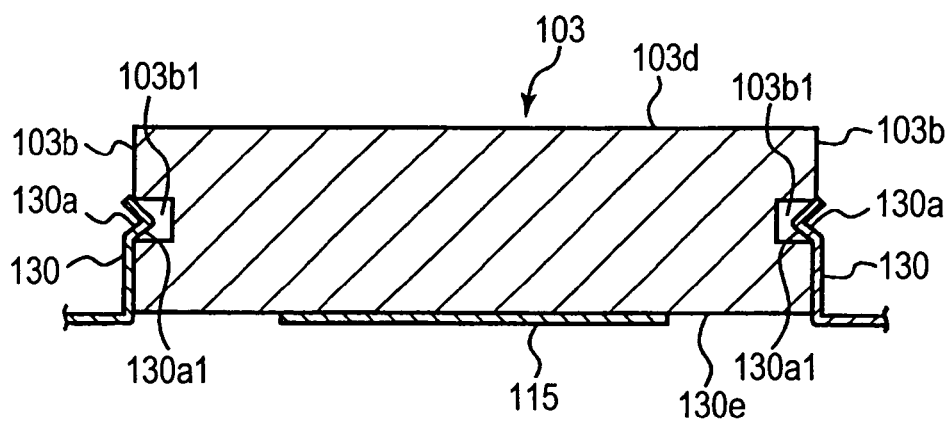
FIG. 8 is a cross-sectional view illustrating an attachment structure of the slider with respect to the flexure in a magnetic head device according to a second embodiment of the present invention.

As an alternative to the locking segments 116, 116 provided in the tongue segment 115 of the flexure 111 in the above-described embodiment, locking segments 130, 130 having the cross-sectional shape shown in FIG. 8 may be applied. The locking segments 130, 130 are respectively provided with hook portions 130a, 130a. A force component of force applied from each of side surfaces 130a1, 130a1 of the hook portions 130a, 130a towards the corresponding recess 103b1 of the slider 103 acts towards the tongue segment 115 (i.e. towards the flexure 111). This force component allows the slider 103 to be pressure-mounted to the flexure 111.

Figure 9:
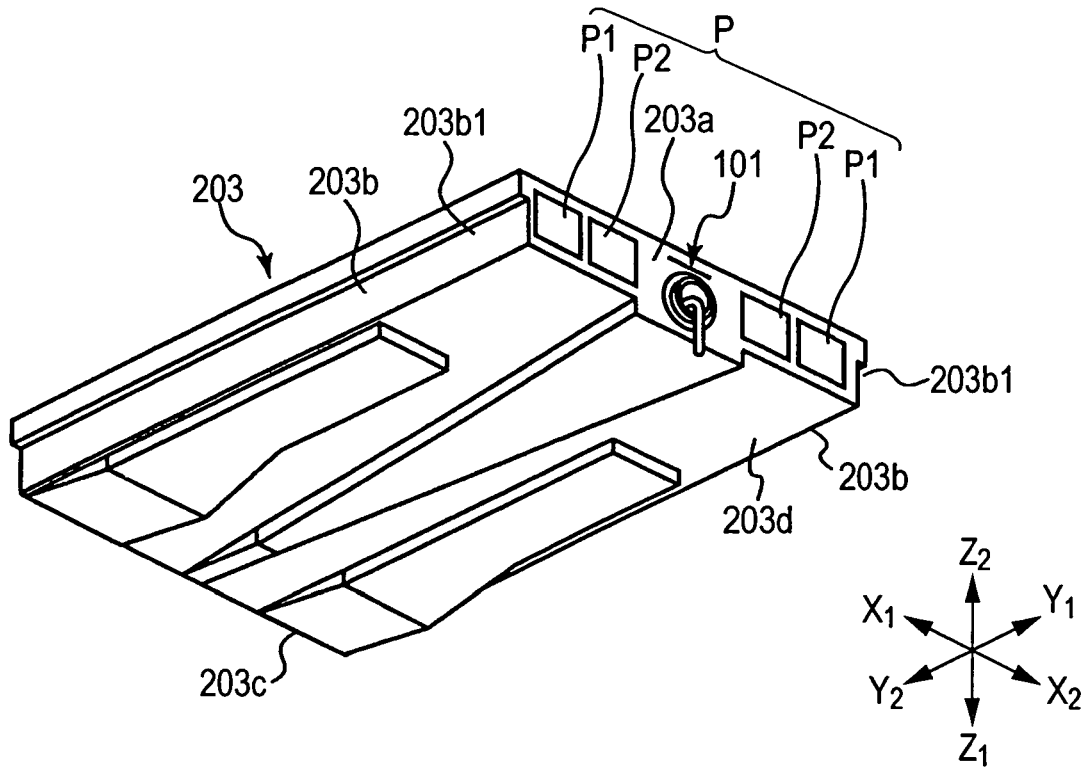
FIG. 9 is a perspective view of the slider in a magnetic head device according to a third embodiment of the present invention.
Figure 10:
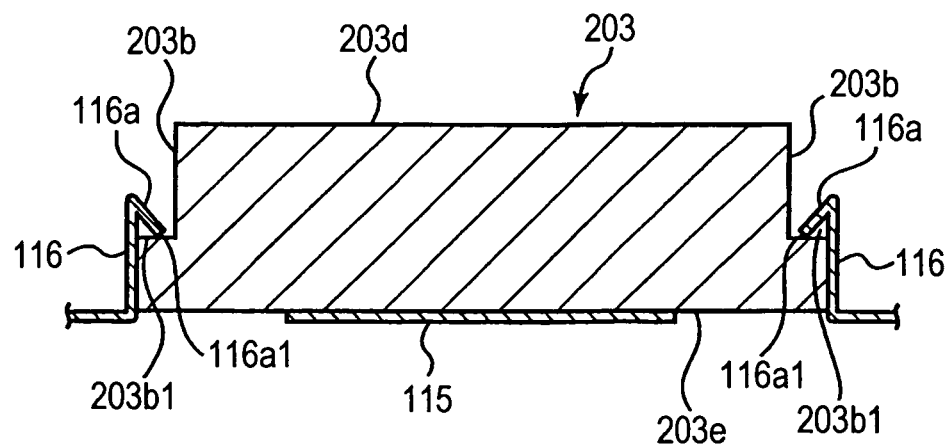
FIG. 10 is a cross-sectional view illustrating an attachment structure of the slider shown in FIG. 9 with respect to the flexure.

As a further alternative, a slider 203 is shown in FIG. 9 in a perspective view. The slider 203 has side surfaces 203b provided with projections 203b1. In this case, as shown in FIG. 10 in a cross-sectional view, the locking segments 116 extending from the tongue segment 115 of the flexure 111 press the corresponding projections 203b1 towards the flexure 111, whereby the slider 203 is fixed to the flexure 111.

In each of the embodiments described above, the locking segments 116 or 130 are integrated with the flexure 111. Alternatively, the locking segments may be disposed on the flexure 111 as separate components from the flexure 111.

Similar to the previous embodiment, the slider has a leading-end surface 203c and a back surface 203 of the slider 103 is directly in contact with the tongue segment 115 of the flexure 111 so that an electrical charge can flow smoothly to a ground, thereby preventing electrostatic damage of the magnetic element 101. When a recording medium D starts to rotate in response to an operation of a rotary driver, airflow is introduced into a space between a surface 203d of the slider 203 facing the recording medium D and the top surface of the recording medium D. Thus, the slider 203 moves above the recording medium D while floating above the recording medium D by a predetermined distance $\delta 1$.

What is claimed is:

1. A magnetic head device comprising:
   a slider having a magnetic element for at least one of recording and reproducing; and
   a flexure supporting the slider, the flexure comprising a tongue segment which is formed by partially cutting out the flexure,
   wherein the slider has a hexahedral structure, one of the side surfaces of the hexahedron defining an electrode surface provided with an electrode unit, said two of the side surfaces of the hexahedron that are adjacent to the electrode surface are provided with recesses, and the slider is placed with a back surface of the slider on the tongue segment, the back surface of the slider being located on the opposite side of a surface facing a recording medium, wherein locking segments are formed disposed in the tongue segment, the locking segments being integrated with the tongue segment and extending from the tongue segment toward directions of the side surfaces of the slider, wherein a tip of each locking segment is bent to form an acute angle hook portion, the tip of the hook portion being directed toward the tongue segment and contacting on an under surface of each corresponding recesses of the slider which is located in the back surface side of the slider, and wherein a force component of a force applied from the tip of each hook portion presses the under surface of each corresponding recess of the slider which is located in the back surface side of the slider towards the tongue segment, a surface of the tongue segment being the slider fixed face, so that back surface of the slider is fixed on the tongue segment and that a position of the two side surfaces of the slider on the tongue segment is regulated.

2. The magnetic head device according to claim 1, wherein the slider and the flexure are electrically conductive.

3. The magnetic head device according to claim 1, wherein the flexure has an electrode connection part that is connected to the electrode surface of the slider with a conductive connector disposed therebetween, such that the position of the electrode surface on tongue segment is regulated.

4. The magnetic head device according to claim 1, wherein the flexure has a regulating segment extending from the tongue segment, the regulating segment regulating the position of a side surface of the hexahedron that is opposite to the electrode surface on the tongue segment.

5. The magnetic head device according to claim 1, wherein each of the locking segments is extended vertically from the tongue segment along with the side surface of the slider.

6. A magnetic head device comprising:
a slider having a magnetic element for at least one of recording and reproducing; and
a flexure supporting the slider, the flexure comprising a tongue segment which is formed by partially cutting out the flexure, wherein the slider has a hexahedral structure, one of the side surfaces of the hexahedron defining an electrode surface provided with an electrode unit, said two of the side surfaces of the hexahedron that are adjacent to the electrode surface are provided with recesses, and the slider is placed with a back surface of the slider on the tongue segment, the back surface of the slider being located on the opposite side of a surface facing a recording medium, wherein locking segments are disposed in the tongue segment, the locking segments being integrated with the tongue segment and extending from the tongue segment toward directions of the side surfaces of the slider, wherein a side surface of each locking segment is bent toward the slider to form an acute angle bent portion, and an inner surface of a corner of the bent portion directly contacts on a corner positioned between an under surface of each corresponding recess of the slider which is located in the back surface side of the slider and side surface of the slider, and wherein a force component of a force applied from a side of each bent portion presses the corner towards the tongue segment, a surface of the tongue segment being the slider fixed face, so that the back surface of the slider is fixed on the tongue segment and that a position of the two side surfaces of the slider on the tongue segment is regulated.

7. The magnetic head device according to claim 6, wherein the slider and the flexure are electrically conductive.

8. The magnetic head device according to claim 6, wherein the flexure has an electrode connection part that is connected to the electrode surface of the slider with a conductive connector disposed therebetween, such that the position of the electrode surface on the tongue segment is regulated.

9. The magnetic head device according to claim 6, wherein the flexure has a regulating segment extending from the tongue segment, the regulating segment regulating the position of a side surface of the hexahedron that is opposite the electrode surface on the tongue segment.

10. The magnetic head device according to claim 6, wherein each of the locking segments is extended vertically from the tongue segment along with the side surface of the slider.

11. A magnetic head device comprising:
a slider having a magnetic element for at least one of recording and reproducing; and
a flexure supporting the slider, the flexure comprising a tongue segment which is formed by partially cutting out the flexure, wherein the slider has a hexahedral structure, one of the side surfaces of the hexahedron defining an electrode surface provided with an electrode unit, said two of the side surfaces of the hexahedron that are adjacent to the electrode surface are provided with projections, and the slider is placed with a back surface of the slider on the tongue segment, the back surface of the slider being located on the opposite side of a surface facing a recording medium, wherein locking segments are formed in the tongue segment, the locking segments being integrated with the tongue segment and extending from the tongue segment toward directions of the side surfaces of the slider, wherein a tip of each locking segment is bent to form an acute angle hook portion, the tip of the hook portion being directed toward the tongue segment and contacting on an under surface of each corresponding projections of the slider, and wherein a force component of a force applied from a tip of each hook portion presses an upper surface of each corresponding projection of the slider which is located in the back surface side of the slider towards the tongue segment, a surface of the tongue segment being the slider fixed face, so that the back surface of the slider is fixed on the tongue segment and that a position of the two side surfaces of the slider on the tongue segment is regulated.

12. The magnetic head device according to claim 11, wherein the slider and the flexure are electrically conductive.

13. The magnetic head device according to claim 11, wherein the flexure has an electrode connection part that is connected to the electrode surface of the slider with a conductive connector disposed therebetween, such that the position of the electrode surface on the tongue segment is regulated.

14. The magnetic head device according to claim 11, wherein the flexure has a regulating segment extending from the tongue segment, the regulating segment regulating the position of a side surface of the hexahedron that is opposite to the electrode surface on the tongue segment.

15. The magnetic head device according to claim 11, wherein each of the locking segments is extended vertically from the tongue segment along with the side surface of the slider.

* * * * *